(12) United States Patent
Huang

(10) Patent No.: US 10,123,000 B2
(45) Date of Patent: Nov. 6, 2018

(54) BACKLIGHT MODULE AND STEREOSCOPIC DISPLAY DEVICE USING THE SAME

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 150 days.

(21) Appl. No.: 15/270,005

(22) Filed: Sep. 20, 2016

(65) Prior Publication Data

US 2018/0027227 A1 Jan. 25, 2018

(30) Foreign Application Priority Data

Jul. 20, 2016 (TW) .............................. 105122841 A

(51) Int. Cl.
*H04N 13/305* (2018.01)
*H04N 13/307* (2018.01)
(Continued)

(52) U.S. Cl.
CPC .......... *H04N 13/305* (2018.05); *G02B 6/003* (2013.01); *G02B 6/0038* (2013.01);
(Continued)

(58) Field of Classification Search
CPC .......... H04N 13/0404; H04N 13/0497; H05B 37/0281; G02B 6/0038; G02B 6/0061;
(Continued)

(56) References Cited

U.S. PATENT DOCUMENTS

2008/0316596 A1* 12/2008 Cha .................... G02B 27/2214
359/463
2009/0086473 A1* 4/2009 Tan ..................... G02F 1/13318
345/102

(Continued)

FOREIGN PATENT DOCUMENTS

TW I332068 B 10/2010
TW 201439593 A 10/2014

OTHER PUBLICATIONS

Jian-Chiun Liou et al, Design and fabrication of optical system for time-multiplex autostereoscopic display, vol. 19, No. 12 / Optics Express, Jun. 6, 2011.
Ko-Wei Chien et al, Time-multiplexed three-dimensional displays based on directional backlights with fast-switching liquid-crystal displays, Applied Optics vol. 45, No. 13, May 1, 2006, p. 3106-3110.

(Continued)

*Primary Examiner* — Tat C Chio
(74) *Attorney, Agent, or Firm* — CKC & Partners Co., Ltd.

(57) ABSTRACT

A backlight module includes a light source module, a light timing control unit, a light guide plate and a lenticular lens. The light source module includes first light sources and second light sources. The lenticular lens disposed beside a side surface of the light guide plate and optically coupled between the light source module and the light guide plate, the lenticular lens having a central axis and a plurality of lenticular units. Each lenticular unit has a central optical axis, and one of the first light sources covered by one of the lenticular units is symmetrically disposed with respect to the central optical axis of the lenticular unit covering the first light source, at least two of the second light sources covered by one of lenticular units are disposed symmetrically with respect to the central optical axis of the lenticular unit covering the second light sources.

20 Claims, 5 Drawing Sheets

(51) Int. Cl.
  *H04N 13/398*  (2018.01)
  *F21V 8/00*    (2006.01)
  *G02B 27/22*   (2018.01)
  *H05B 37/02*   (2006.01)
  *H04N 13/32*   (2018.01)

(52) U.S. Cl.
  CPC ......... *G02B 6/0061* (2013.01); *G02B 6/0068* (2013.01); *G02B 27/2264* (2013.01); *H04N 13/32* (2018.05); *H04N 13/398* (2018.05); *H05B 37/0281* (2013.01); *H04N 2213/001* (2013.01)

(58) Field of Classification Search
  CPC ... G02B 6/003; G02B 27/2264; G02B 6/0068
  See application file for complete search history.

(56) References Cited

U.S. PATENT DOCUMENTS

2012/0236403 A1*  9/2012  Sykora .............. G02B 27/2214
                                                    359/463
  2013/0322114 A1* 12/2013  Nishitani ............ G02B 6/0051
                                                    362/606
  2014/0104881 A1   4/2014  Yang et al.

OTHER PUBLICATIONS

Xiangbing Zhu et al, Novel high-brightness backlight module for autostereoscopic liquid crystal display, Optical Engineering 50(5), May 2011, p. 054001-1-054001-6.

* cited by examiner

BACKLIGHT MODULE AND STEREOSCOPIC DISPLAY DEVICE USING THE SAME

RELATED APPLICATIONS

This application claims priority to Taiwan Application Serial Number 105122841, filed Jul. 20, 2016, which is herein incorporated by reference.

BACKGROUND

Technical Field

The present disclosure relates to a backlight module. More particularly, the present disclosure relates to a directional backlight module.

Description of Related Art

In recent years, with the increasing development of virtual reality technology, an optical product which can show a stereoscopic image has become a focal point in the consumer market. In general, a stereoscopic display device can respectively provide different images to two eyes of an observer, and the eyes of the observer can respectively receive different image information, so that the observer can perceive a stereoscopic image by exploiting the binocular parallax of typical human sight.

Generally, an autostereoscopic display device may respectively transmit light beams of different images to two eyes of the observer based on a time-multiplexed method or a spatial-multiplexed method. As a result, the observer may perceive a stereoscopic image without wearing glasses, thus increasing user's comfort and convenience. However, how to further improve optical characteristics of the autostereoscopic display and provide a multi-views function of the autostereoscopic display becomes one of important research and development issues, and is an urgent need to be improved in the related fields.

SUMMARY

The disclosure provides a backlight module, which can maintain a directionality of the backlight module, and can increase a light intensity uniformity of lights generated by the backlight module.

In accordance with some embodiments of the present disclosure, a backlight module includes a light source module, a light timing control unit, a light guide plate and a lenticular lens. The light source module includes a plurality of first light sources and a plurality of second light sources. The light timing control unit is configured to control light-emitting times of the first light sources to be different from light-emitting times of the second light sources. The light guide plate includes at least one main surface and a side surface which are adjacent to each other, and an area of the main surface is larger than an area of the side surface. The lenticular lens is disposed beside the side surface of the light guide plate and optically coupled between the light source module and the light guide plate, and the lenticular lens has a central axis and a plurality of lenticular units. Each of the lenticular units has a central optical axis, and one of the first light sources covered by one of the lenticular units is symmetrically disposed with respect to the central optical axis of the lenticular unit covering the first light source, at least two of the second light sources covered by one of the lenticular units are disposed symmetrically with respect to the central optical axis of the lenticular unit covering the second light sources, and the first light sources and the second light sources are symmetrically arranged with respect to the central axis in an alternating manner.

In accordance with some embodiments of the present disclosure, a stereoscopic device includes a backlight module, a display panel and an image switch control unit. The image switch control unit is configured to control the display panel to display images time sequentially, and the first light sources and the second light sources are switched synchronously with the images.

In one or more embodiments of this disclosure, the lenticular lens is optically coupled between the light source module and the light guide plate, and the first light sources and the second light sources are disposed symmetrically with respect to the central optical axis of the lenticular unit covering the first light source and the second light sources, and the first light sources and the second light sources are symmetrically arranged with respect to the central axis in the alternating manner, such that the propagation direction of first light in the light guide plate may also be symmetrical with respect to the central optical axis, and the propagation direction of the second light in the light guide plate may also be symmetrical with respect to the central optical axis, thus facilitating the directionality of the backlight module. Furthermore, since the main surface of the light guide has the cylindrical structures, and sizes of cylindrical structures are increasing along the direction away from the light source module, so as to adjust the light intensity of the first lights and the second lights, facilitating improving the uniformity of the light intensity of the backlight module. Furthermore, the backlight module and the display panel are switched synchronously, such that the stereoscopic display may provide the observer with stereoscopic images based on a time-multiplexed method or a spatial-multiplexed method.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
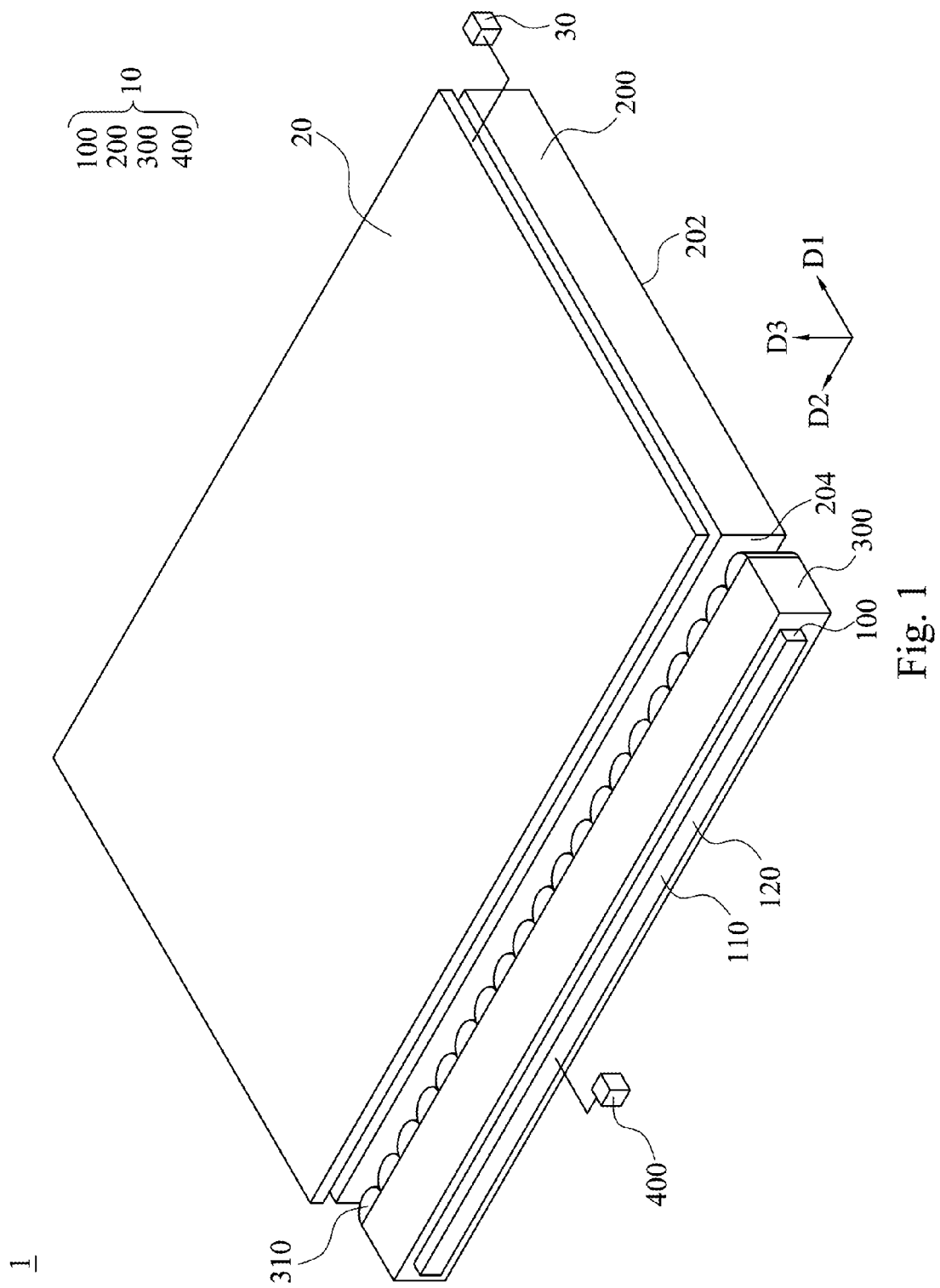
FIG. 1 is a perspective view of a stereoscopic display device in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Furthermore, the term "device A is optically coupled to device B" indicates a light from or through the device A can directly propagate into the device B, and if a light from or through the device A can propagate into the device B, the other optical devices can be interposed between the device A and the device B. Similarly, the term "device A is optically coupled between device B and device C" indicates a light can propagate into the device A, device B and device C, and other optical devices can be interposed between the device A, device B and the device C.

Reference is made to FIG. 1, which is a perspective view of a stereoscopic display device in accordance with some embodiments of the present disclosure. As shown in FIG. 1, a stereoscopic display device 1 includes a backlight module 10, a display panel 20 and an image switch control unit 30. The backlight module 10 includes a light source module 100, and the light source module 100 includes first light sources 110 and second light sources 120. The image switch control unit 30 is configured to control the display panel 20 to display images PX time sequentially, and the first light sources 110 and the second light sources 120 are switched substantially synchronously with the images PX. In other words, the images PX can be classified as a first group of images PX1 and second group of images PX2, and the display panel 20 may alternately display the first group of images PX1 and the second group of the second group of images PX2 time sequentially. At the same time, the first light sources 110 and the second light source 120 may alternately emit light, and the first light sources 110 and the second light sources 120 are switched substantially synchronously with the first group of images PX1 and the second group of images PX2. As a result, the stereoscopic display device 1 may combine the backlight module 10, the display panel 20 and the image switch control unit 30 by utilizing a time-multiplexed method and a spatial-multiplexed method, so as to provide two eyes of an observer with different images, thus providing a stereoscopic image for the observer.

More particularly, in some embodiments, as shown in FIG. 1, the backlight module 10 includes the light source module 100, a light guide plate 200, a lenticular lens 300 and a light timing control unit 400. The display panel 20 is disposed on the light guide plate 200 of the backlight module 10. The backlight module 10 is controlled by the light timing control unit 400 to control light-emitting times of the first light sources to be different from light-emitting time of the second light sources, and the backlight module 10 may provide the display panel 20 with directional lights time sequentially. For example, at a first time point, the first light source 110 of the light source module 100 may emit first light L1. The first light L1 may be guided into the display panel 20 by the light guide plate 200, and the display panel 20 may substantially provide the first group of images PX1 synchronously, such that the first light L1 with the image information of the display panel 20 may be transmitted to a first target position. Similarly, at a second time point, the second light source 120 of the light source module 100 may emit second light L2. The second light L2 may be guided into the display panel 20 by the light guide plate 200, and the display panel 20 may substantially provide the second group of images PX2 synchronously, such that the second light L2 with the image information of the display panel 20 may be transmitted to a second target position. As a result, by switching the backlight module 10 and the display panel 20 synchronously, the stereoscopic display device 1 may provide different images for the first target position and the second target position. When two eyes of an observer are respectively within the ranges of the first target position and the second target position, the observer may perceive a stereoscopic image.

Configurations of the light source module 100, the light guide plate 200, the lenticular lens 300 and the light timing control unit 400 of the backlight module 10 are described as follows.

Figure 2:
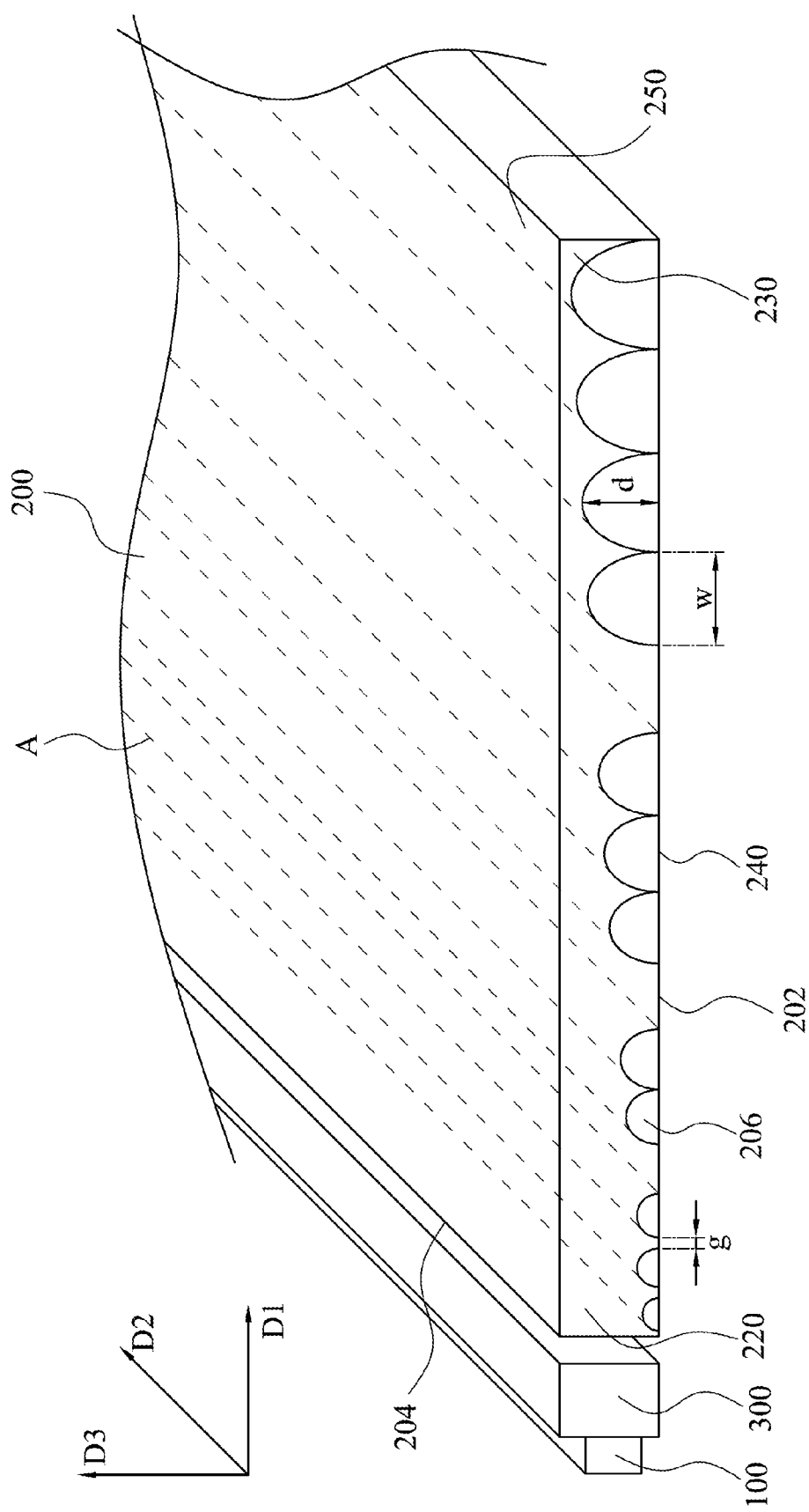
FIG. 2 is a perspective view of a backlight module in accordance with some embodiments of the present disclosure.
Figure 3:
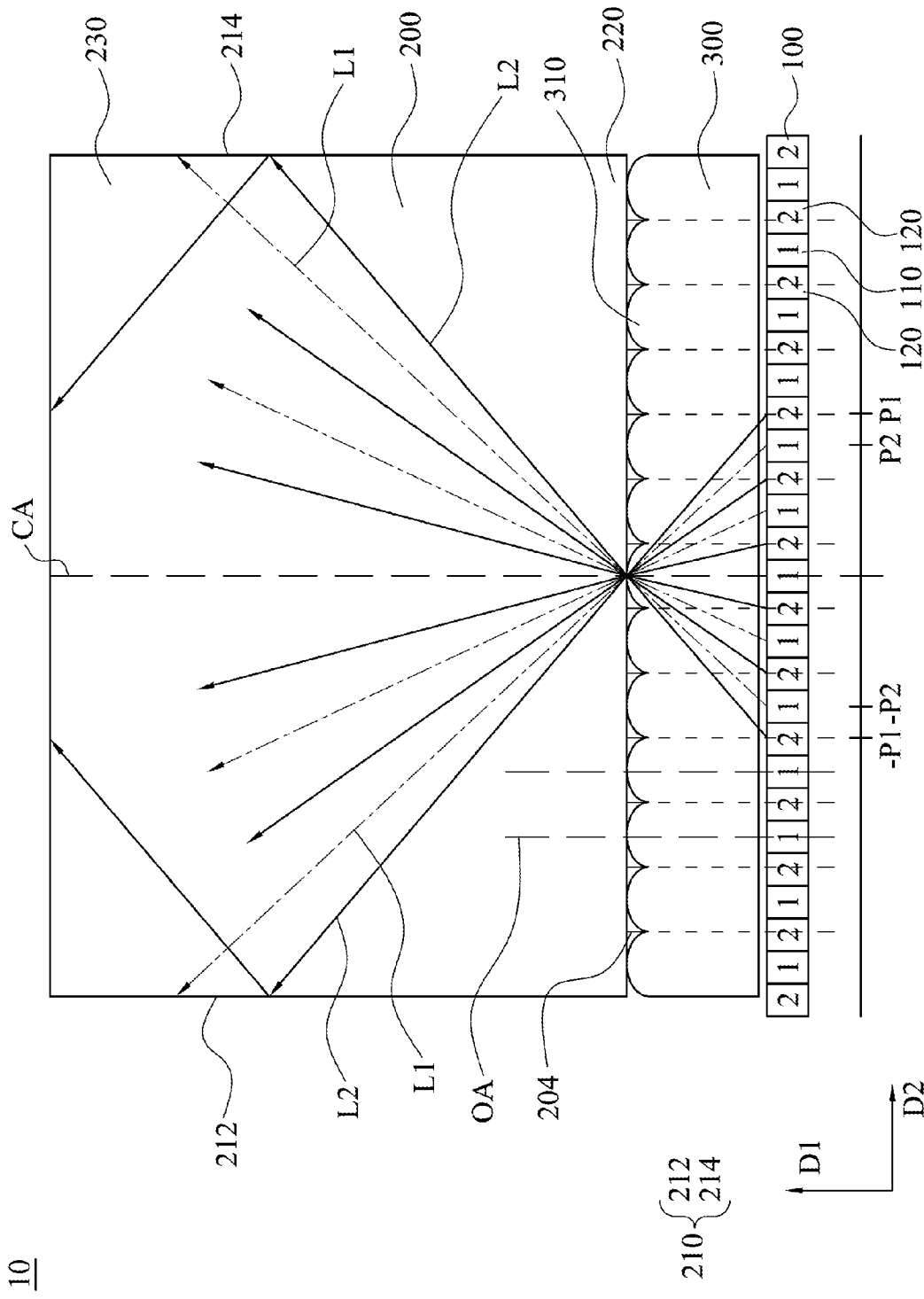
FIG. 3 is a top view of the backlight module in accordance with some embodiments of the present disclosure.

Reference is made to FIG. 2 and FIG. 3. FIG. 2 is a perspective view of a backlight module 10 in accordance with some embodiments of the present disclosure. FIG. 3 is a top view of a backlight module 10 in accordance with some embodiments of the present disclosure. As shown in FIG. 2 and FIG. 3, the light guide plate 200 includes at least one adjacent main surface 202 and a side surface 204, and an area of the main surface 202 is larger than an area of the side surface 204. The lenticular lens 300 is disposed beside the side surface 204 of the light guide plate 200 and optically coupled between the light source module 100 and the light guide plate 200. The lenticular lens 300 has a central axis CA and a plurality of lenticular units 310. Each lenticular unit 310 has a central optical axis OA, and one of the first light sources 110 covered by one of the lenticular units 310 is symmetrically disposed with respect to the central optical axis OA of the lenticular unit 310 covering the first light source 110. The second light sources 120 covered by one of the lenticular units 310 are also symmetrically disposed with respect to the central optical axis OA of the lenticular unit 310 covering the second light sources 120. The first light sources 110 and the second light sources 120 are symmetrically arranged with respect to the central axis CA in an alternating manner. More particularly, in some embodiments, the light source module 100, the lenticular lens 300 and the light guide plate 200 are sequentially disposed along a first direction D1, the first light sources 110 and the second light sources 120 are disposed in the alternating manner along a second direction D2, and the first direction D1 and the second direction D2 are substantially perpendicular. As a result, the backlight module 10 may be made to be directional.

More particularly, in some embodiments, as shown in FIG. 2 and FIG. 3, the main surface 202 and the side surface 204 of the light guide plate may intersect each other, and the main surface 202 and the side surface 204 may be perpendicular to each other. The lenticular lens 300 is disposed beside the side surface 204 of the light guide plate 200, that is, the side surface 204 of the light guide plate may abut against the lenticular lens 300 to receive light from the lenticular lens 300, such that the lights may propagate into the light guide plate 200 through the side surface 204. In other words, when the first light sources 110 emits the first light L1 toward the lenticular lens 300, or the second light sources 120 emits the second light L2 towards the lenticular lens 300, the lenticular lens may adjust a propagation direction of the first light L1 and a propagation direction of the second light L2, enabling the propagation direction of the first light L1 to be different from the propagation direction of the second light L2, so as to facilitate transmitting the first light L1 and the second light L2 respectively into the first target position and the second target position.

Furthermore, since the first light source 110 is symmetrically disposed with respect to the central optical axis OA of the lenticular unit 310 covering the first light source 110, the second light source 120 is also symmetrically disposed with respect to the central optical axis OA of the lenticular unit 310 covering the second light source 120, and the first light sources 110 and the second light sources 120 are symmetrically arranged with respect to the central axis CA in the alternating manner, such that the first light L1 emitted from the first light source 110 is also symmetrical with respect to the central optical axis OA of the lenticular unit 310 covering the first light source 110, and the second light L2 emitted from the second light source 120 is also symmetrical with respect to the central optical axis OA of the lenticular unit 310 covering the second light source 120. More particularly, when the first light L1 propagates into the light guide plate 200, the propagation direction of the whole first light L1 is also symmetrical with respect to the central axis CA of the lenticular lens 300. Even if the first light L1 arrives a side wall 210 of the light guide plate 200 and is reflected, the propagation direction of the whole first light L1 is still be symmetrical with respect to the central axis CA of the lenticular lens 300. Similarly, when the second light L2 propagates into the light guide plate 200, the propagation direction of the whole second light L2 is still symmetrical with respect to the central axis CA of the lenticular lens 300. Even if the second light L2 arrives the side wall 210 of the light guide plate 200 and is reflected, the propagation direction of the whole second light L2 is still symmetrical with respect to the central axis CA of the lenticular lens 300. As a result, by the symmetrical configuration of the first light sources 110 and the second light sources 120, the first light L1 and the second light L2 may be transmitted respectively and exactly to the first target position and the second target position, facilitating the directionality of the backlight module 10.

More particularly, as shown in FIG. 3, the side surface 204 of the light guide plate 200 is a light input surface. The light input surface is configured to receive the first light L1 and the second light L2 propagating from the lenticular lens 300, and the central axis CA of the lenticular lens may intersect with a center of the side surface 204 of the light guide plate 200. In other words, the side wall 210 of the light guide plate includes a first side wall 212 and a second side wall 214 opposite to each other. The first side wall 212 and the second side wall 214 are connected to the side surface 204 of the light guide plate 200. The central axis CA of the lenticular lens 300 is located between the first side wall 212 and the second side wall 214, and a distance between the central axis CA and the first side wall 212 may be equal to a distance between the central axis CA and the second side wall 214. That is, the central axis CA may be a geometric central axis of the lenticular lens 300. In some embodiments, the first side wall 212 and the second side wall may have a reflector (which is not shown in the figure), such as a reflection mirror. For example, the reflection mirror may be disposed on the two sides of the light guide plate 200, and alternatively, the reflection mirror may extend to two sides of the lenticular lens 300 and to two sides of the light source module 100, facilitating guiding the light more exactly, so as to achieve the directionality of the backlight module 10.

For example, in some embodiments, the second light source 120 is used as an example. As shown in FIG. 3, using the central axis of the lenticular lens 300 as a reference zero point, since the second light sources 120 are symmetrical disposed with respect to the central axis CA, such that there is one second light source 120 at a positive position P1, and there is another second light source 120 at a negative position −P1. When the second light source 120 at the positive position P1 emits the second light L2, the propagation direction of the second light L2 may be varied by the lenticular lens 300, such that the second light L2 may propagate along a left front direction of the light guide plate 200 as shown in FIG. 3 to arrive the first side wall 212 of the light guide plate 200. Then, the first side wall 212 may reflect the second light L2, such that the second light L2 may propagate along a right front direction of the light guide plate 200 as shown in FIG. 3. Simultaneously, the second light source 120 at the negative position −P1 emits the second light L2, the propagation direction of the second light L2 may be varied by the lenticular lens 300, such that the second light L2 may propagate along the right front direction of the light guide plate 200 as shown in FIG. 3 to arrive the second side wall 214 of the light guide plate 200. Then, the second side wall 214 may reflect the second light L2, such that the second light L2 may propagate along the left front direction of the light guide plate 200 as shown in FIG. 3. In other words, since the second light sources 120 are symmetrical disposed with respect to the central axis CA, an optical length between the second light L2 and the positive position P1 may be equal to an optical length between the second light L2 and the negative position −P1. That is, when the second light L2 from the positive position P1 is reflected by the first side wall 212, the second light L2 from the negative position −P1 may correspondingly be reflected by the second side wall 214. As shown in FIG. 3, the second light L2 from the positive position P1 may propagate from the left front direction to the right front direction, and meanwhile, the second light L2 from the negative position −P1 may propagate from the right front direction to the left front direction. As a result, the propagation direction of the second light L2 from the positive position P1 may be switched with the propagation direction of the second light L2 from the negative position −P1, which may facilitate achieving the directionality of the backlight module 10.

Similarly, in some embodiments, the first light source 110 is used as an example. As shown in FIG. 3, take the central axis of the lenticular lens 300 as a reference origin, since the first light sources 110 are symmetrical disposed with respect to the central axis CA, an optical length of the first light L1 from the positive position P2 may be equal to an optical length of the first light L1 from the negative position −P2. Therefore, when the first light L1 from the positive position P2 is reflected by the first side wall 212, the first light L1 from the negative position −P2 may correspondingly be reflected by the second side wall 214. As shown in FIG. 3, the first light L1 from the positive position P2 may propagate from the leftfront direction to the rightfront direction, at the same time, the first light L1 from the negative position −P2 may propagate from the right front direction to the left front direction. As a result, the propagation direction of the first light L1 from the positive position P2 may switch for the propagation direction of the first light L1 from the negative position −P2, which may benefit to realize the directionality of the backlight module 10.

In some embodiments, as shown in FIG. 2, the light guide plate 200 includes a plurality of cylindrical structures 206, and the cylindrical structures 206 are disposed on the main surface 202 which is far away the display panel 20 (reference is made to FIG. 2). The cylindrical structures 206 have increasing sizes along a direction away from the light source module. More particularly, in some embodiments, the light guide plate includes a proximal portion 220 and a distal portion 230 opposite to each other and a bottom portion 240 and light output portion 250 opposite to each other. The proximal portion 220 is closer to the lenticular lens than the distal portion 230 is, and the side surface 204 is disposed on the proximal portion 220 of the light guide plate 200. The side surface 204 is configured to receive the first light L1 and the second light L2 (as shown in FIG. 3), and the first light L1 and the second light L2 may be transmitted from the proximal portion 220 to the distal portion 230 by a total internal reflection characteristic of the light guide plate 200. The bottom portion 240 is farther away from the display panel 20 than the light output portion 250 is. The main surface 202 is disposed on the bottom portion 240, and the cylindrical structures 206 are disposed on the main surface 202 of the bottom portion 240 for breaking the total internal reflection of the light guide plate 200, so the first light L1 or the second light L2 transmitted in the light guide plate 200 may be redirected to a third direction D3 leaving the light guide plate from the light output portion 250. The cylindrical structures 206 have increasing sizes along a direction away from the light source module (that is, the first direction). In other words, the more the cylindrical structure 206 is apart from the light source module 100, the larger the size of the cylindrical structure 206 may be. More particularly, the size of the cylindrical structure 206 disposed in the proximal portion 220 of the light guide plate 200 is smaller than that of the distal portion 230 of the light guide plate 200. Thus, when the first light L1 and the second light L2 propagate from the proximal portion 220 to the distal portion 230, the first light L1 and the second light L2 may be reflected by the cylindrical structure 206 in the distal portion 230 more easily to leave the light guide plate 200. Although, the first light L1 and the second light L2 arriving at the distal portion 230 may have the less light flux, but by such configuration of the cylindrical structures 206 of the light guide plate 200 as described above, the backlight module 10 is beneficial to improve a uniformity of the light intensity.

More particularly, in some embodiments, as shown in FIG. 2, at least one of the cylindrical structures 206 has a lengthwise axis A being substantially parallel with a arranged direction of the first light sources 110 and the second light sources 120 (that is, a second direction D2). In other words, when the first light L1 or the second light L2 is transmitted in the light guide plate 200, the first light L1 or the second light L2 propagating along the lengthwise axis A (that is, the second direction D2) may merely propagate along surfaces of the cylindrical structures 206. As a result, the first light L1 or the second light L2 propagating along the lengthwise axis A (that is, the second direction D2) may not be varied the propagation direction by the cylindrical structures 206, so the first light L1 or the second light L2 propagating along the second direction D2 may maintain its directionality. The first light L1 or the second light L2 propagating along the first direction D1 may intersect the surfaces (such as curved surface) of the cylindrical structures 206, so the surfaces of the cylindrical structures 206 may break the total internal reflection of the first light L1 or the second light L2, making the first light L1 or the second light L2 be redirected to the third direction to leave the light guide plate 200 from the light output portion 250. Therefore, when the lengthwise axis A of the cylindrical structures 206 is substantially parallel with the second direction D2 and the sizes of cylindrical structures 206 is increasing along the first direction D1 away from the light source module 100, the light along the second direction D2 emitted from the backlight module 10 may maintain its directionality, and the light intensity of the backlight module 10 may be more uniform.

More particularly, in some embodiments, as shown in FIG. 2, the cylindrical structures 206 have increasing depths d along the direction away from the light source module 100. In other words, the proximal portion 220 of the light guide plate 200 has the cylindrical structure 206 with a depth d smaller than that of the distal portion 230, that is, the distal portion 230 of the light guide plate 200 has the cylindrical structure 206 with a depth d larger than that of the proximal portion 220. Therefore, when the first light L1 and the second light L2 propagate into the light guide plate 200, since the depth d of cylindrical structure 206 in the distal portion 230 is larger, the first light L1 and the second light L2 may easily intersect with the cylindrical structure 206 in the distal portion 230 to be reflected by the cylindrical structure 206 to leave the light guide plate 200. Therefore, in the distal portion 230, an escape probability of the first light L1 and the second light L2 to leave the light guide plate 200 may be increased. Furthermore, since the distal portion 230 is farther away from the light source module 100 than the proximal portion 220, the light flux of the first light L1 and the second light L2 transmitted in the distal portion 230 may be less than that in the proximal portion 220. Therefore, by increasing the escape probability of the first light L1 and the second light L2 to leave the light guide plate 200 in the distal portion 230, the light intensity of the backlight module 10 may be more uniform.

In some embodiments, as shown in FIG. 2, widths W of the cylindrical structures 206 are increasing along the direction away from the light source module 100. In other words, the width W of the cylindrical structure 206 disposed in the proximal portion 220 of the light guide plate 200 is smaller than that of the distal portion 230 of the light guide plate 200. As a result, in the distal portion 230, the escape probability of the first light L1 and the second light L2 to leave the light guide plate 200 may be increased. More particularly, when the first light L1 and the second light L2 are transmitted in the proximal portion 220 of the light guide plate 200, the first light L1 and the second light L2 may have the greater light flux but have less escape probability to leave the light guide plate 200. On the contrary, when the first light L1 and the second light L2 are transmitted in the distal portion 230 of the light guide plate 200, the first light L1 and the second light L2 may have the less light flux but have greater escape probability to leave the light guide plate 200. Therefore, by adjusting the light flux and the escape probability of the first light L1 and the second light L2, the light intensity in the proximal portion 220 of the backlight module 10 may be substantially equal to the light intensity in the distal portion 230 of the backlight module 10, so as to facilitate improving the uniformity of the light intensity of the backlight module 10.

In some embodiments, as shown in FIG. 2, arrange densities of the cylindrical structures 206 are increasing along the direction away from the light source module. In other words, there is a gap g between any two adjacent cylindrical structures 206, and the gap g in the proximal portion 220 of the light guide plate 200 is larger than that of in the distal portion 230 of the light guide plate 200. Therefore, when the first light L1 and the second light L2 propagate into the light guide plate 200, since the cylindrical structures 206 is sparsely disposed in the proximal portion 220 (that is, in the proximal portion 220, the gap g between any two adjacent cylindrical structures 206 is larger), the first light L1 and the second light L2 may not easily intersect with the cylindrical structures 206 in the proximal portion 220, so as to reduce the escape probability of the first light L1 and the second light L2 in the proximal portion 220 to leave the light guide plate 200. Therefore, by adjusting the arrange density of the cylindrical structures 206 in the proximal portion 220 and in the distal portion 230, the escape probability of the first light L1 and the second light L2 in the proximal portion 220 may further be adjusted, so as to facilitate improving the uniformity of the light intensity of the backlight module 10.

More particularly, in some embodiments, as shown in FIG. 3, two of the lenticular units 310 respectively have equal overlapping areas with the respectively covering first light sources 110, and two of the lenticular units 310 respectively have equal overlapping areas with the respectively covering second light sources 120. For example, as shown in FIG. 3, one complete first light source 110, a left part of one second light source 120, and a right part of another second light source 120 are correspondingly disposed under the lenticular unit 310. Particularly, as shown in FIG. 3, if the overlapping area of the first light sources 110 covered by its lenticular unit 310 is A1 (in other words, the complete first light source 110 has the area A1), each the lenticular unit may have the overlapping area A1 with the first light source 110 covered by its lenticular unit 310. Similarly, if the overlapping area of the second light sources 120 covered by its lenticular unit 310 is A2 (in other words, the left part of one second light source 120 has the area ½*A2 and the right part of another second light source 120 has the area ½*A2), each of the lenticular units may have the overlapping area A2 with the second light sources 120 covered by its lenticular unit 310. Furthermore, each the lenticular unit 310 may have the equal overlapping areas with the first light sources 110 and the second light sources 120, and all of the overlapping areas of the first light sources 110 and the second light sources 120 may be A1+A2 (that is, the area A1 of the complete first light source 110, the area ½*A2 of the left part of one second light source 120 and the area ½*A2 of the right part of another second light source 120). In some embodiments, the area A1 may be equal. As a result, each lenticular unit 310 may cover the equal overlapping area of the first light sources 110, and each lenticular unit 310 may cover the equal overlapping area of the second light sources 120. In other words, the lenticular units 310 may cover the similar sizes of the first light sources 110 and the second light sources 120. That is, the lenticular units 310 may cover the first light L1 and the second light L2 within the similar light emitting angle, making the first light L1 emitted by the first light source 110 and the second light L2 emitted by the second light source 120 be scattered at the similar angles after through the lenticular unit 310. Therefore, when the first light L1 and the second light L2 are reflected by the side wall 210 of the light guide plate 200, the first light L1 may maintain its propagation direction along the second direction D2, and the second light L2 may maintain its propagation direction along the second direction D2, so the first light L1 and the second light L2 may respectively and exactly be transmitted to the first target position and the second target position, benefiting to realize the directionality of the backlight module 10.

Figure 4:
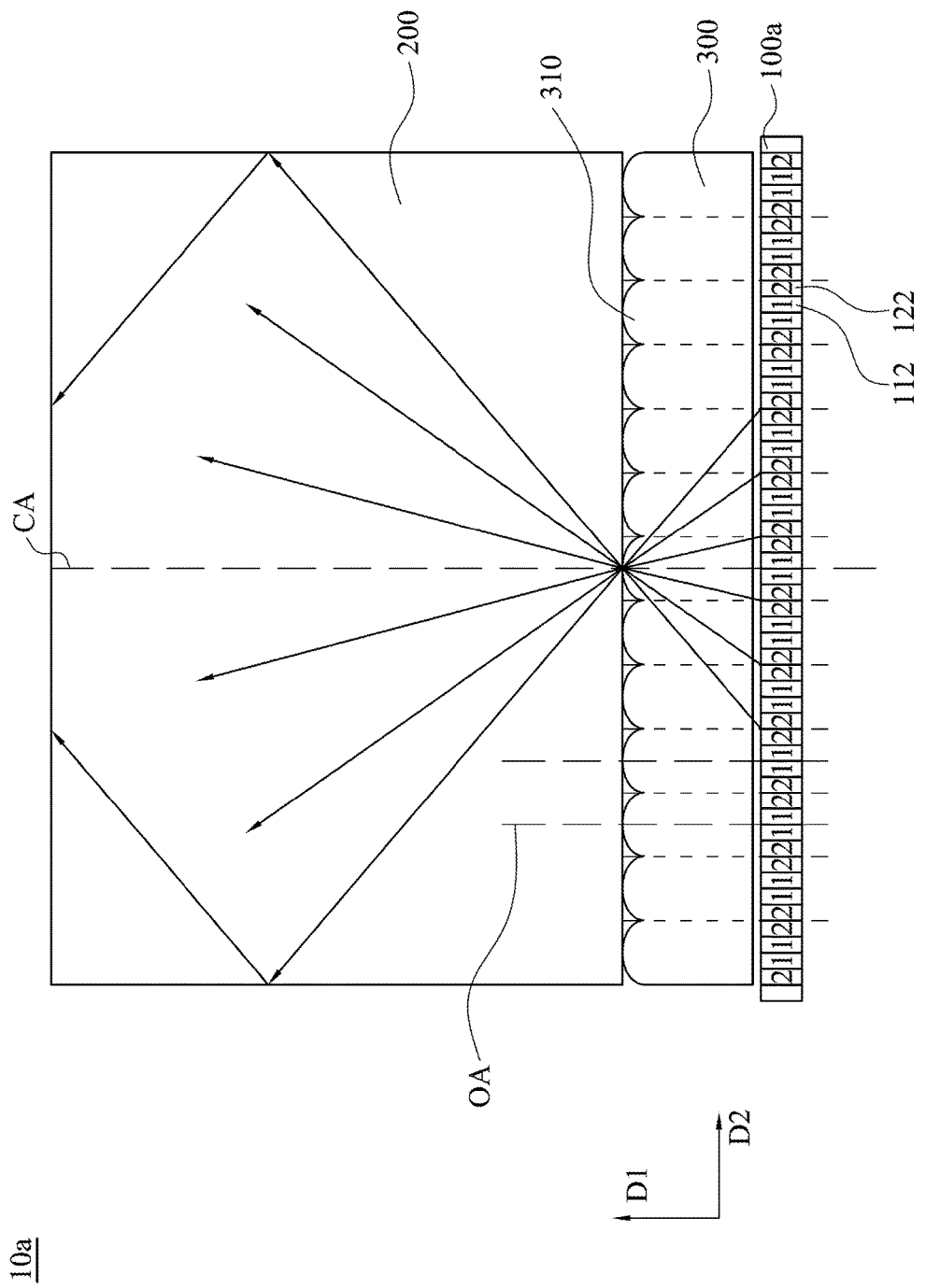
FIG. 4 is a top view of the backlight module in accordance with other embodiments of the present disclosure.

More particular, in some embodiments, as shown in FIG. 3, any two of the adjacent lenticular units 310 may cover the same second light source 120. In other words, one of the lenticular units 310 may cover the left part of the second light source 120 and another of the lenticular units 310 may cover the right part of the second light source 120. As a result, the configuration number of the light sources of the backlight module 10 may be reduced, benefiting to simplify the structure of the backlight module 10 and save cost. FIG. 4 is a top view of a backlight module 10a in accordance with other embodiments of the present disclosure. The first light source 110 may include two first light emitting units 112, and the second light source may include two second light emitting units 122. Any two of the adjacent lenticular units 310 may cover the different second light emitting units 122.

In some embodiments, as shown in FIG. 2, the lenticular units 310 are arranged along a direction of the lengthwise axis A of the cylindrical structures 206. In other words, the arranged direction of the lenticular units 310 is substantially parallel with the direction of the lengthwise axis A of the cylindrical structures 206 (that is, the second direction D2). As a result, when the first light L1 or the second light L2 propagates through the lenticular units 310, since the lenticular units 310 are arranged along the second direction D2, the lenticular units 310 may vary the propagation direction of the first light L1 transmitted along the second direction D2 and the propagation direction of the second light L2 transmitted along the second direction D2, so as to guide the first light L1 and the second light L2 to the first target position and the second target position respectively. Furthermore, since the lenticular units 310 are arranged along the direction of the lengthwise axis A of the cylindrical structures 206, thus, the propagation direction of the first light L1 transmitted along the first direction D1 and the propagation direction of the second light L2 transmitted along the first direction D1 may not be varied by the lenticular units 310, so as to maintain the directionality of the first light L1 and the second light L2 transmitted along the second direction D2, thus facilitating achieving the directionality of the backlight module 10.

More particularly, in some embodiments, as shown in FIG. 2 and FIG. 3, the first light sources 110 and the second light sources 120 are disposed on a focal plane of the lenticular lens 300. In other words, the lenticular lens 300 may respectively transfer the first light L1 within large scattered angles emitted from the first light source 110 and the second light L2 within large scattered angles emitted from the second light source 120 into parallel lights along their directions. Since the first light source 110 is abutted against the second light source 120, when the first light sources 110 and the second light sources 120 are disposed on the focal plane of the lenticular lens 300, the intersection angle between the propagation direction of the first light L1 and that of the second light L2 may not be unduly divergent, thus facilitating achieving the directionality of the backlight module 10. It is to be understood that, in practical applications, the position of the first light sources 110 and the second light sources 120 may be adjusted in accordance with the configuration of another devices, it is not limited to be the parallel lights. Furthermore, in some embodiments, as shown in FIG. 2 and FIG. 3, the light source module 100 is disposed at the same side of the light guide plate 200, and the lenticular lens 300 may vary the optical path of the light source module 100. As a result, the structure of the backlight module 10 may be simplified, thus minimizing and thinning the backlight module 10.

More particularly, in some embodiments, the light timing control unit 400 is configured to control the first light sources 110 covered by the different lenticular units 310 to emit light synchronously, and the light timing control unit 400 is configured to control the second light sources 120 covered by the different lenticular units 310 to emit light synchronously. In other words, the first light sources 110 covered by the different lenticular units 310 are controlled by the light timing control unit 400 to emit light synchronously, and the second light sources 120 covered by the different lenticular units 310 are controlled by the light timing control unit 400 to emit light synchronously. For example, in some embodiments, at a first time point, the light timing control unit 400 may control the first light sources 110 covered by the different lenticular units 310 to emit the first light L1, and each first light L1 may be guided to the first target position by the lenticular lens 300 and the light guide plate 200. Similarly, at a second time point, the light timing control unit 400 may control the second light sources 120 covered by the different lenticular units 310 to emit the second light L2, and each second light L2 may be guided to the second target position by the lenticular lens 300 and the light guide plate 200. As a result, at the same time, the first lights may be guided to the first target position, or the second lights may be guided to the second target, such that the region of the first target position or the second target position may be enlarged, thus being advantageous to be applied in the stereoscopic display.

Figure 5:
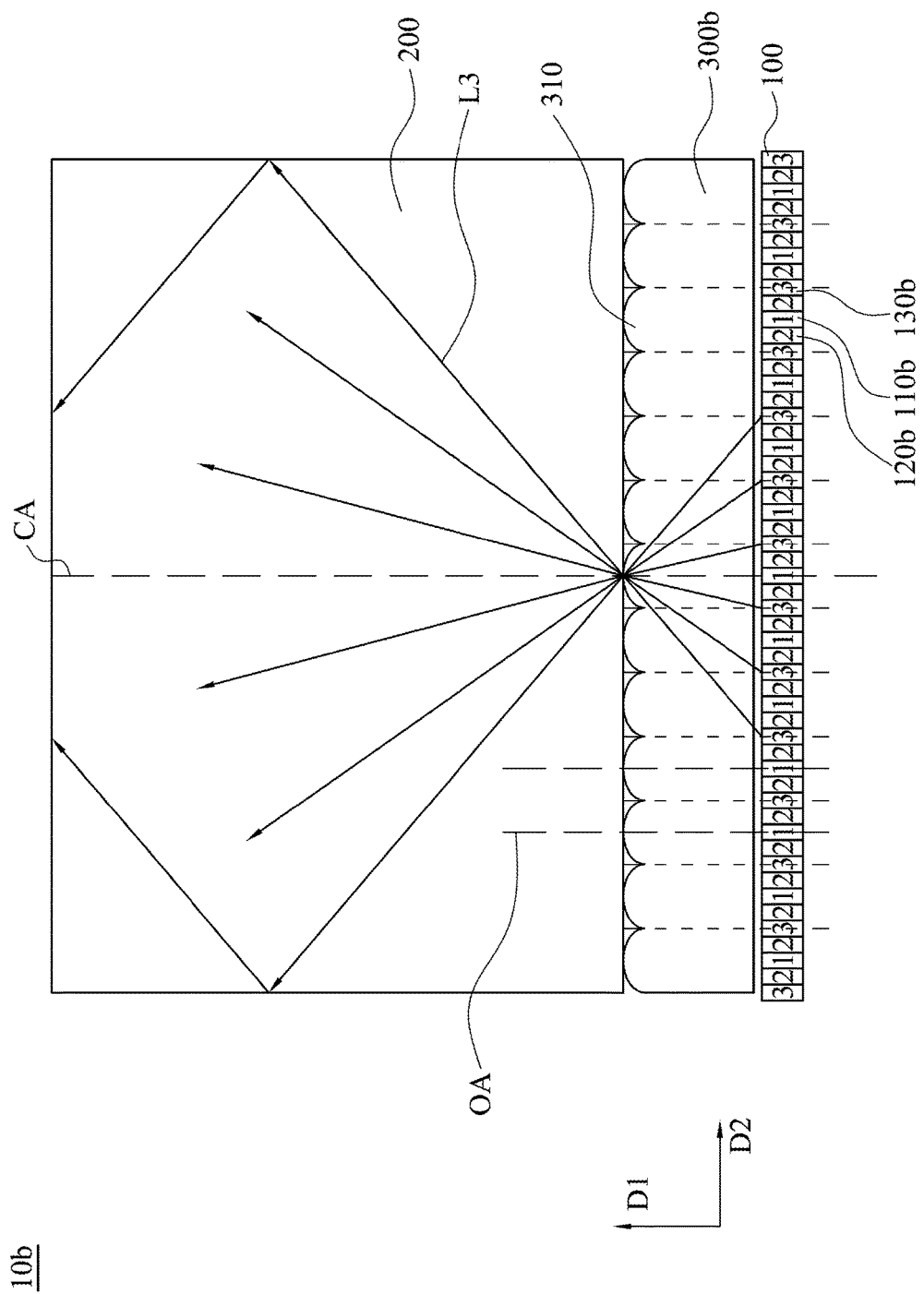
FIG. 5 is a top view of the backlight module in accordance with other embodiments of the present disclosure.

Reference is made to FIG. 5, which is a top view of a backlight module 10b in accordance with another embodiment of the present disclosure. In some embodiments, as shown in FIG. 5, the backlight module 10b may further include a plurality of auxiliary light sources 130b. The light timing control unit 400 is configured to control the light-emitting times of the auxiliary light sources 130b to be different from light-emitting times of the first light sources 110b and light-emitting times of the second light sources 120b. For example, in some embodiments, as shown in FIG. 5, a light source module 100b further includes a plurality of first light sources 110b, a plurality of second light sources 120 and a plurality of auxiliary light sources 130b, and the light timing control unit 400 is configured to control the first light sources 110b to emit first light L1 time sequentially, to control the second light sources 120b to emit the second light L2 time sequentially, and to control the auxiliary light sources 130b to emit third light L3 time sequentially. The first light sources 110b, the second light sources 120b and the auxiliary light sources 130b are arranged in the alternating manner described as follows. In the following descriptions, the position of each of the first light sources 110b is denoted as 1, the position of each of second light sources 120b is denoted as 2, and the position of each of the auxiliary light source 130b is denoted as 3. The arrangement of the first light sources 110b, the second light sources 120b and the auxiliary light sources 130b may be denoted as [321123], and the first light sources 110b, the second light sources 120b and the auxiliary light sources 130b are periodically arranged with the arranging rule [321123].

Furthermore, in some embodiments, as shown in FIG. 5, the first light sources 110b are symmetrically disposed with respect to the central optical axis OA of the lenticular unit 310 covering on the first light sources 110b, the second light sources 120b are also symmetrically disposed with respect to the central optical axis OA of the lenticular unit 310 covering on the second light sources 120b, the auxiliary light sources 130b are also symmetrically disposed with respect to the central optical axis OA of the lenticular unit 310 covering on the auxiliary light sources 130b, and the first light sources 110b, the second light sources 120b and the auxiliary light sources 130b are symmetrically arranged with respect to the central axis CA in the alternating manner, so the propagation direction of the first light L1 in the light guide plate 200 may also be symmetrical with respect to the central optical axis OA, the propagation direction of the second light L2 in the light guide plate 200 may also be symmetrical with respect to the central optical axis OA, and the propagation direction of the third light L3 in the light guide plate 200 may also be symmetrical with respect to the central optical axis OA. Therefore, the propagation directions of the first lights L1, the second lights L2, and the third lights L3 transmitted and reflected by the light guide plate 200 may not be varied, such that the first lights L1, the second lights L2 and the third light L3 may be transmitted respectively and exactly to the first target position, the second position and a third target position, thus facilitating achieving the directionality of the backlight module 10b and improving observing zones of the stereoscopic display.

In some embodiments, the auxiliary light sources 130b may be classified as a first group auxiliary light sources and a second group auxiliary light sources, and the light timing control unit 400 is configured to control the light-emitting times of the first light sources, those of the second light sources, those of the first group auxiliary light sources and those of the second group auxiliary light sources to be different. The first light sources, the second light sources, the first group auxiliary light sources and the second group auxiliary light sources are arranged as follows. In the following descriptions, the position of each of the first light sources is denoted as 1, the position of each of second light sources is denoted as 2, the position of each of the first group auxiliary light sources is denoted as 3, and the position of each of the second group auxiliary light source is denoted as 4. The arrangement of the first light sources, the second light sources, the first group auxiliary light sources and the second group auxiliary light sources may be denoted as [43211234], and first light sources, the second light sources, the first group auxiliary light sources and the second group auxiliary light sources are periodically arranged with the arranging rule [43211234].

In practical applications, each of the lenticular units 310 of the lenticular lens 300 may be designed to cover at least N groups of light sources (which is larger than 3 groups of light sources as shown in FIG. 5, such as 4 groups, 5 groups or 6 groups), each of the N groups of light sources may emit lights in a different time sequence. As a result, the light source module 100 may emit N different group of light within different propagation directions and within different emitting times, so as to improve the number of the observing zones where the light may respectively be transmitted. Therefore, the region of the sweet spot (the region where can provide two eyes of the observer with the great stereoscopic images) may be enlarged.

In one or more embodiments of this disclosure, the lenticular lens is optically coupled between the light source module and the light guide plate, and the first light sources and the second light sources are disposed symmetrically with respect to the central optical axis of the lenticular unit covering these first light sources and the second light sources, and the first light sources and the second light sources are symmetrically arranged with respect to the central axis in the alternating manner, so the propagation direction of first light in the light guide plate may also be symmetrical with respect to the central optical axis OA, and the propagation direction of the second light in the light guide plate may also be symmetrical with respect to the central optical axis OA, thus facilitating achieving the directionality of the backlight module. Furthermore, since the main surface of the light guide has the cylindrical structures, and such cylindrical structures have the increasing size along the direction away from the light source module, so as to adjust the light intensity of the first lights and the second lights, thus facilitating improving the uniformity of the light intensity of the backlight module. Furthermore, the backlight module and the display panel are switched synchronously, so the stereoscopic display may provide the observer with stereoscopic images based on a time-multiplexed method or a spatial-multiplexed method.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
a light source module comprising a plurality of first light sources and a plurality of second light sources;
a light timing control unit configured to control light-emitting times of the first light sources to be different from light-emitting times of the second light sources;
a light guide plate comprising at least one main surface and a side surface that are adjacent to each other, an area of the main surface being larger than an area of the side surface; and
a lenticular lens disposed beside the side surface of the light guide plate and optically coupled between the light source module and the light guide plate, the lenticular lens having a central axis and a plurality of lenticular units, wherein each of the lenticular units has a central optical axis, and one of the first light sources covered by one of the lenticular units is symmetrically disposed with respect to the central optical axis of the lenticular unit covering the first light source, at least two of the second light sources covered by one of the lenticular units are disposed symmetrically with respect to the central optical axis of the lenticular unit covering the second light sources, and the first light sources and the second light sources are symmetrically arranged with respect to the central axis in an alternating manner.

2. The backlight module of claim 1, wherein two of the lenticular units have equal overlapping areas with the respectively covering first light sources, and two of the lenticular units have equal overlapping areas with the respectively covering second light sources.

3. The backlight module of claim 2, wherein the light timing control unit is configured to control the first light sources covered by the different lenticular units to emit light synchronously, and the light timing control unit is configured to control the second light sources covered by the different lenticular units to emit light synchronously.

4. The backlight module of claim 1, wherein the first light sources and the second light sources are disposed on a focal plane of the lenticular lens.

5. The backlight module of claim 1, wherein the light source module further comprises a plurality of auxiliary light sources and the light timing control unit is configured to control light-emitting times of the auxiliary light sources to be different from light-emitting times of the first light sources and light-emitting times of the second light sources, wherein the first light sources, the second light sources and the auxiliary light sources are arranged in the alternating manner.

6. The backlight module of claim 1, wherein the light guide plate has a plurality of cylindrical structures, and the cylindrical structures are disposed on the main surface, and sizes of the cylindrical structures are increasing along a direction away from the light source module.

7. The backlight module of claim 6, wherein at least one of the cylindrical structures has a lengthwise axis being substantially parallel with an arranged direction of the first light sources and the second light sources.

8. The backlight module of claim 6, wherein depths of the cylindrical structures are increasing along the direction away from the light source module.

9. The backlight module of claim 6, wherein widths of the cylindrical structures are increasing along the direction away from the light source module.

10. The backlight module of claim 6, wherein arrangement densities of the cylindrical structures are increasing along the direction away from the light source module.

11. A stereoscopic display device, comprising:
a backlight module, comprising:
a light source module comprising a plurality of first light sources and a plurality of second light sources;
a light timing control unit configured to control light-emitting times of the first light sources to be different from light-emitting times of the second light sources;
a light guide plate comprising at least one main surface and a side surface that are adjacent to each other, an area of the main surface being larger than an area of the side surface; and
a lenticular lens disposed beside the side surface of the light guide plate and optically coupled between the light source module and the light guide plate, the lenticular lens having a central axis and a plurality of lenticular units, wherein each of the lenticular units has a central optical axis, and one of the first light sources covered by one of the lenticular units is symmetrically disposed with respect to the central optical axis of the lenticular unit covering the first light source, at least two of the second light sources covered by one of the lenticular units are disposed symmetrically with respect to the central optical axis of the lenticular unit covering the second light sources, and the first light sources and the second light sources are symmetrically arranged with respect to the central axis in an alternating manner;
a display panel; and
an image switch control unit configured to control the display panel to display images time sequentially, wherein the first light sources and the second light sources are switched synchronously with the images.

12. The stereoscopic display device of claim 11, wherein two of the lenticular units have equal overlapping areas with the respectively covering first light sources covered, and two of the lenticular units have equal overlapping areas with the respectively covering second light sources.

13. The stereoscopic display device of claim 11, wherein the light timing control unit is configured to control the first light sources covered by the different lenticular units to emit light synchronously, and the light timing control unit is configured to control the second light sources covered by the different lenticular units to emit light synchronously.

14. The stereoscopic display device of claim 11, wherein the first light sources and the second light sources are disposed on a focal plane of the lenticular lens.

15. The stereoscopic display device of claim 11, wherein the light source module further comprises a plurality of auxiliary light sources and the light timing control unit is configured to control light-emitting times of the auxiliary light sources to be different from light-emitting time of the first light sources and light-emitting time of the second light sources, wherein the first light sources, the second light sources and the auxiliary light sources are arranged in the alternating manner.

16. The stereoscopic display device of claim 11, wherein the light guide plate has a plurality of cylindrical structures, and the cylindrical structures are disposed on the main surface, and the cylindrical structures have increasing sizes along a direction away from the light source module.

17. The stereoscopic display device of claim 16, wherein at least one of the cylindrical structures has a lengthwise axis being substantially parallel with an arranged direction of the first light sources and the second light sources.

18. The stereoscopic display device of claim 16, wherein depths of the cylindrical structures are increasing along the direction away from the light source module.

19. The stereoscopic display device of claim 16, wherein widths of the cylindrical structures are increasing along the direction away from the light source module.

20. The stereoscopic display device of claim 16, wherein arrangement densities of the cylindrical structures are increasing along the direction away from the light source module.

* * * * *